Aug. 19, 1947.  E. A. MOSCA  2,425,817
PIPE FITTING
Filed Feb. 1, 1946
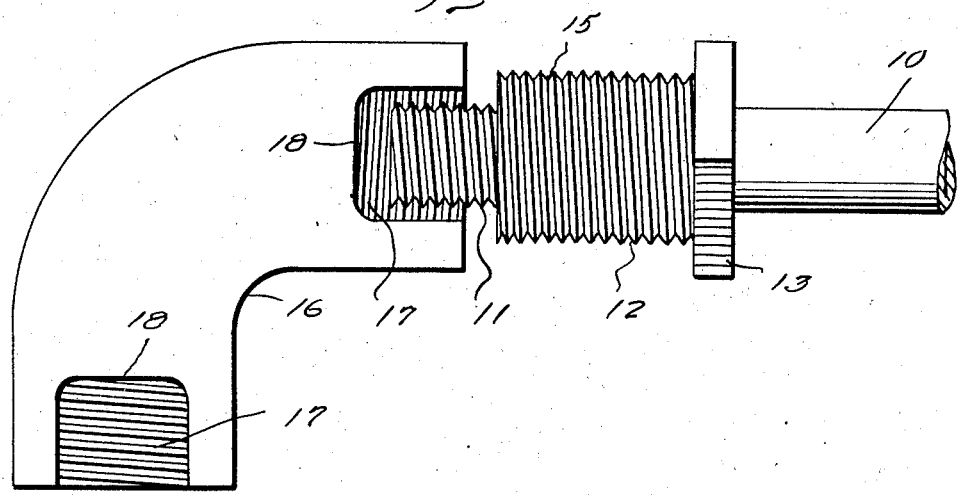
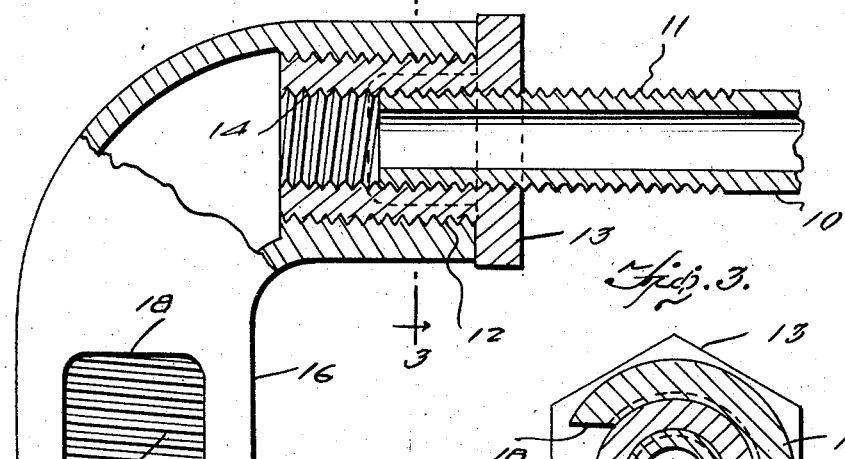
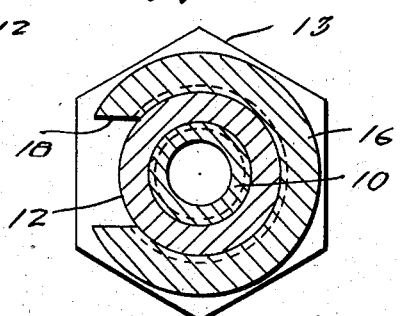
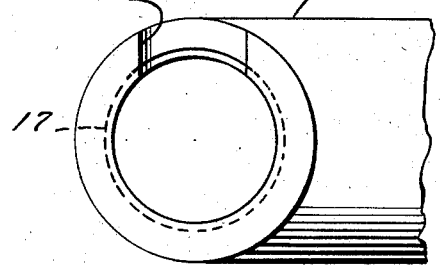
Inventor
Edward A. Mosca
Attorneys Patented Aug. 19, 1947

2,425,817

UNITED STATES PATENT OFFICE 2,425,817

PIPE FITTING

Edward A. Mosca, Atlantic City, N. J.

Application February 1, 1946, Serial No. 644,695

1 Claim. (Cl. 285—198)

My invention relates to pipe fittings and the object of my invention is to provide pipe fittings adapted to facilitate the removal and replacement of a damaged pipe in a pipe line.

Another object of my invention is to provide pipe fittings eliminating the necessity of removing a plurality of pipes in order to be able to remove a leaky pipe from a pipe line.

Other objects of my invention may appear in the following specification describing my invention with reference to the accompanying drawing illustrating a preferred embodiment of my invention. It is however to be understood that my invention is not to be limited and restricted to the exact construction and combination of parts described in the specification and shown in the drawing, but that such changes and modifications can be made which fall within the scope of claim appended hereto. Attention is called to the fact particularly, that while an elbow is described in the specification and shown in the drawing, any other pipe fitting, such as T, sleeves and the like can be formed in the improved manner forming the subject matter of my invention.

In the drawing:

Figure 1 is a side view of a pipe to be connected with a fitting according to my invention.

Figure 2 is a view similar to Figure 1 partly shown in section, the pipe shown connected with the fitting.

Figure 3 is a sectional view taken on line 3—3 in Figure 2, and

Figure 4 is a bottom plan view of Figure 2.

Referring now to the drawing in detail a pipe 10 is provided at its end with a comparatively long outside thread 11 on which a reducing sleeve 12 is threadedly mounted. This sleeve has on its outer end a nut-like flange 13 to facilitate the operation of the sleeve. The inner thread 14 of the sleeve extends throughout the entire bore of the sleeve, which is provided also with an outer thread 15 which extends over the entire length of the reducing sleeve 12 up to the nut-like flange 13.

A fitting 16, which is shown in the present drawing as an elbow, but can be any other shaped pipe fitting, has the usual inner threads 17 and is provided at its threaded ends with cut-outs 18 which are a little wider than the outside diameter of the pipe 10.

To connect the pipe 10 with the fitting 16, the reducing sleeve 12 is screwed onto the pipe 10 so far that a portion of the pipe 10 will extend beyond the sleeve as shown in Figure 1. This pipe portion is then inserted in the fitting and then the reducing sleeve is screwed into the fitting and is at the same time threadedly moved toward the end of pipe 10 extending beyond the sleeve. The inner thread of the fitting, the outer and inner threads of the sleeve and the thread on the pipe must have the same number of threads per inch.

When a pipe forming a portion of a pipe line, the elements whereof are connected with each other by means of fittings according to my invention, is to be removed, it is only necessary to unscrew the reducing sleeve 12 from the fitting 16 so that the sleeve will be positioned on pipe 10 as shown in Figure 1. The pipe can then be removed from the fitting through the cut-out 18.

While the fitting in the present embodiment of my invention is shown and described as having a cut-out on each of its ends, it would be only necessary to provide such cut-out adjacent one end of the fitting to obtain the same result.

Having described my invention, what I claim and desire to secure by Letters Patent is:

A pipe fitting having an inner thread, an inwardly extending cut-out in the end of the wall of the fitting, a reducing sleeve having an inside and outside thread extending over the entire length of the sleeve and adapted to threadedly engage the inner thread of the fitting, and a pipe having an outside thread adapted to engage the inner thread of the sleeve and longer than the reducing sleeve, all threads having the same amount of feed per revolution and the cut-out in the fittings being wide enough to permit the pipe to enter and leave the fitting through said cut-out.

EDWARD A. MOSCA.

REFERENCES CITED

The following references are of record in the file of this patent:

UNITED STATES PATENTS

| Number | Name | Date |
|---|---|---|
| 1,645,032 | Wilson | Oct. 11, 1927 |
| 1,175,440 | Hagen | Mar. 14, 1916 |
| 1,372,876 | Freund | Mar. 29, 1921 |